(12) United States Patent
Hopper (10) Patent No.: US 7,134,498 B2
(45) Date of Patent: Nov. 14, 2006

(54) WELL DRILLING AND COMPLETIONS SYSTEM

(75) Inventor: Hans Paul Hopper, Aberdeen (GB)

(73) Assignee: Cameron International Corporation, Houston, TX (US)

( * ) Notice: Subject to any disclaimer, the term of this patent is extended or adjusted under 35 U.S.C. 154(b) by 0 days.

(21) Appl. No.: 10/940,140

(22) Filed: Sep. 14, 2004

(65) Prior Publication Data

US 2005/0061514 A1 Mar. 24, 2005

(30) Foreign Application Priority Data

Sep. 24, 2003 (EP) .................................. 03256018

(51) Int. Cl.
*E21B 29/12* (2006.01)
(52) U.S. Cl. ........................ 166/357; 166/368; 166/267
(58) Field of Classification Search ................ 166/357, 166/367, 368, 351, 267; 175/5–7
See application file for complete search history.

(56) References Cited

U.S. PATENT DOCUMENTS

| 3,543,846 A | * | 12/1970 | Smith et al. ................. 166/356 |
| 3,545,215 A | | 12/1970 | Burrus |
| 4,175,039 A | * | 11/1979 | Fisher ......................... 210/747 |
| 4,527,632 A | | 7/1985 | Chaudot |
| 4,955,436 A | * | 9/1990 | Johnston ..................... 166/84.1 |
| 5,004,051 A | * | 4/1991 | Rosendahl et al. .......... 166/357 |
| 6,062,313 A | * | 5/2000 | Moore ......................... 166/357 |
| 6,129,152 A | * | 10/2000 | Hosie et al. ................. 166/384 |
| 6,216,799 B1 | * | 4/2001 | Gonzalez ....................... 175/5 |
| 6,269,880 B1 | | 8/2001 | Landry |
| 6,276,455 B1 | * | 8/2001 | Gonzalez ..................... 166/357 |
| 6,325,159 B1 | | 12/2001 | Peterman et al. |
| 6,328,118 B1 | * | 12/2001 | Karigan et al. ............... 175/66 |
| 6,527,054 B1 | * | 3/2003 | Fincher et al. .............. 166/357 |
| 6,578,637 B1 | | 6/2003 | Maus et al. |
| 2002/0007968 A1 | | 1/2002 | Gardes |
| 2003/0062198 A1 | | 4/2003 | Gardes |
| 2004/0031622 A1 | * | 2/2004 | Butler et al. .................... 175/5 |

FOREIGN PATENT DOCUMENTS

| WO | WO 03/023181 | 3/2003 |
| WO | WO 03/078793 | 9/2003 |

* cited by examiner

*Primary Examiner*—Thomas A Beach
(74) *Attorney, Agent, or Firm*—Conley Rose, P.C.

(57) ABSTRACT

A system for use in down hole operations, the system comprising a wellhead; a BOP ram package connected at one end to the wellhead and having an axial bore extending from the wellhead to the other end; a device above the other end of the BOP ram package for isolating the pressure of the wellhead; a fluid take off between the pressure containing means and the BOP ram package; a separator in communication with the fluid take of such that, in use, a multi-phase medium obtained from the well can be separated into its constituent phases; and a pressure control device on each of one or more outlets from the separator for allowing the system to be operated at different wellhead pressures.

26 Claims, 8 Drawing Sheets

WELL DRILLING AND COMPLETIONS SYSTEM

CROSS-REFERENCE TO RELATED APPLICATIONS

This application claims priority to European Patent Application No. 03256018.7, which was filed Sep. 24, 2003, and is titled "Well Drilling and Completions System."

STATEMENT REGARDING FEDERALLY SPONSORED RESEARCH OR DEVELOPMENT

Not Applicable.

BACKGROUND

This invention relates to a system for use in creating and carry out subsequent operations in a well and, in particular, to a system which allows access to a well bore, either subsea or at the surface, whilst ensuring that the well pressure at the wellhead is controlled.

When drilling a well, the single mechanical safety barrier is the BOP stack connected to the wellhead. The BOP ram package contains the high pressure rams and usually the medium pressure annular. For subsea the BOP lower riser package, connected to the upper end of the BOP ram package is arranged to be disconnected from the BOP ram package, for example, in the event of an emergency to release the riser and vessel.

The need to drill at either a "low pressure" or for kick control is required when entering a permeable low pressure formation which requires to be drilled with a specific mud. Most top sections of a hole can be drilled with a standard mud and in a method which follows conventional practices.

Currently, wells are drilled from the surface with mud columns and the necessary monitoring is carried out from, or at, the drill floor. When drilling a well, the mud weight is a critical factor for three main reasons. Firstly, the pressure differential on the kick/fracture gradient which gives a drilling pressure margin between the pore and fracture pressures is critical. Secondly, the formation pressure versus the mud pressure (hydrostatic head and circulation pressure) affects the rate of penetration. Finally, the kick control pressures need to be controlled in order to manage a well kick and to maintain the ability to circulate the gas out of the well within the well design limits.

Drilling a production well with a balanced or overbalanced mud weight can clog open formations causing severe permanent permeability damage, i.e. the hydrocarbon flow rate from the well is drastically reduced. A solution is to drill the formation with a mud column which has a lower hydrostatic head pressure than the reservoir pressure. This is generally known as under balanced drilling. Muds that can achieve this could be water based, oil based, foam gas or a combination.

For surface BOP operations, the use of certain preferred muds could result in the mud pressure in the BOP being above atmospheric pressure.

A means of sealing around the drilling string, whilst at the same time allowing the tubular equipment to move in or out of the well is necessary. In known configurations, downstream of a surface BOP, the well annulus flow has to be choked back prior to entering a low pressure separator in order to remove any entrained gas in the return mud flow. The mud at atmospheric pressure then passes over shale shakers to remove the cuttings prior to entering the mud pumps. For subsea BOP operations, the density of the mud column means it is necessary to operate through the surface BOP with the wellhead pressure being less than the mud hydrostatic head to the surface.

Typically, underbalanced drilling has been limited to coil tubing drilling because of its simplicity, i.e. the coil tubing is not rotated, has no tool joints and coil tubing BOP's are designed for tubing to be stripped in and out of the hole under pressure. An important criteria for an underbalanced well is that, at no time in its life, must the formation be subjected to over pressure. As the formation has no protection from excessive pressure, considerable damage will occur very quickly. This applies in all aspects of accessing the well, for example, during drilling the well, casing operations, running the completion, testing and workovers.

One of the prime advantages of underbalanced drilling is that production from the open and free formations can be up to 50% higher than if the well had been drilled in a conventional manner. Typically, under balanced drilling is only performed on land wells, as opposed to subsea wells, due to the complexity of the operation and the considerable size of the hardware required. For example, it is necessary to have access to the BOP, the chokes, the separators, the pumps, and it must be possible to control the system carefully.

In deep water (i.e. 1000 metres or more), some reservoirs are not subjected to the overburden pressure of the ground above, which would be experienced on land or shallow water location wells. This means these reservoirs have a low overburden pressure relative to the hydrostatic head of water. Therefore, a small increase in pressure can result in fracturing the formation, causing an underground blow out. A small decrease in mud pressure will result in a well kick. Accordingly, there is a narrow operating pressure margin in between the formation pore and fracture pressures which limits the distances which can be drilled in one stage especially in a horizontal section. In order to drain a reservoir fully, it is typically necessary for more wells to be provided and these wells need to be evenly spaced across the field to ensure that all regions of the field are accessed. Accordingly, developments of this sort are extremely costly.

When drilling in deeper waters, the operator of a well must remain within the safe drilling limits in order to control the well completely and so that it is possible to handle unplanned scenarios which include well kick operations such as kick detection relative to the large mud circulating volume, movement of a floating vessel that alters the mud circulation volume, the gelling effect of muds which increases the friction and therefore the circulating pressure, the friction caused by the limited size and length of the choke and kill lines, operating in the narrow mud weight window, and then attempting to control a kick on the surface.

U.S. Pat. No. 6,276,455 shows a horizontal subsea separation system which is piped off the base of the riser unit to a sea bed gravity separation unit, and with an independent riser for mud returns. The system operates at the ambient water pressure and therefore would not support any mud in the drilling riser bore.

SUMMARY

According to the present invention, there is provided a system for use in well operations, the system comprising: a wellhead, a BOP ram package connected at one end to the wellhead and having an axial bore extending from the wellhead to the other end, a device above the other end of the BOP ram package for containing the pressure of the well head, a fluid take off between the pressure containing means and the BOP ram package, a separator in communication with the fluid take off such that, in use, a multi-phase medium obtained from the well can be separated into its constituent phases; and a pressure control device on each of one or more outlets from the separator for allowing the system to be operated at different wellhead pressures.

Preferably, the pressure control device includes at least one of a choke or a pump. If a pump is used, it is preferable that it is a variable speed pump. The system preferably comprises a control system for monitoring and controlling the operation of the pressure control devices.

Advantageously, the pressure isolating means may be arranged to allow, in use, a downhole string to be passed therethrough, whilst maintaining its pressure isolating ability. By downhole string, we mean any form of drill pipe, tubing, casing, coil tubing, cable, wire line or other such device which is run down into a well during or after the drilling of the well.

The pressure isolating means may be a flexible seal, such as an annular seal and is preferably rotatably mounted to allow, for example, a drill string, which, in use, will be rotated, to be operated without rotational frictional resistance.

The pressure containing means may include a riser containing a hydrostatic head of fluid.

In a preferred embodiment, the separator includes at least one toroidal separator. A suitable toroidal separator is described in our International patent application No. PCT/GB03/01253 and is defined as a separator for separating multi-phase flow, the separator comprising an inlet for a multi-phase fluid, a plurality of outlets, at least one for each selected separated phase and a main annular tubular bore through which the multi- phase fluid is caused to flow and to separate into lighter and heavier fluids, the bore having an outlet for each of the lighter and heavier fluids.

The system may additionally comprise one or two further toroidal separators and or each toroidal separator may be mounted around a full bore spool, through which access to the well is obtained.

The separator preferably has an outlet for each of gaseous fluid, liquid and solid slurry.

The system may additionally include a cuttings grinding unit between the separator and a slurry pump.

According to a further aspect of the present invention, there is provided a separator for use during well operations, the separator unit comprising: a full bore spool for, in use, connection to a BOP ram package; and a toroidal separator surrounding and in communication with the spool for, in use, separating multi-phase material delivered to the spool from the BOP ram package into its constituent phases.

Such a separator preferably has at least one pressure control device on each outlet from the toroidal separator.

The present invention also provides a method of separating material produced from a well during downhole operations the method comprising the steps of: supplying multi-phase material from a well-head through a BOP ram package to a full bore spool; diverting the multi-phase flow through a toroidal separator; and separating the multi phase flow into its constituent phases.

The method preferably further comprises the step of selectively choking or pumping the constituent phases to achieve a specified wellhead pressure, thereby allowing the system to operate at different wellhead pressures.

The ability to separate at the well head at a specific pressure irrespective of the ambient sea water pressure allows a variety of advantages to be achieved using the present invention. Firstly, low pressure drilling, extending to under balanced drilling, can be carried out. There is a superior control of the mud pressures when drilling in narrow pore fracture margin areas by controlling the operation on the sea bed. Thirdly, the ability to control a kick at the subsea BOP rather than at the surface, results in greater and a more reliable control. Accordingly, the above advantages allow operators to extend their drilling range in a permeable formation and results in a higher production performance from the completed well.

The present invention allows the effects the water depth to be eliminated, by removing the back pressure on the well caused by the mud hydrostatic column to the surface and the flowing friction through the riser vertical section. As such, the benefits, especially when drilling in deep water, are considerable. The invention is, however, still applicable to surface wells and should not be seen to be limited to subsea set-ups.

In a subsea environment, a separator positioned near the well head for separating out any gas and cuttings from the returning mud flow ensures that, by using appropriate pumps, control of the well can be moved from the remote topside down to the seabed, thereby partially removing or eliminating the water depth effect. This allows the separator to be operated at the desired pressure that would improve conventional drilling operations and would permit the use of "low pressure" drilling techniques and permit a wider margin for kick control. In U.S. Pat. No. 6,276,455, the separator module is located on one side of the BOP and this will require significant interconnecting pipework and controls to the BOP stack. Such a configuration is arduous to achieve in deep water and, as a large number of deep water seabeds consist of unstable materials, such as 5 to 15 metres of mud, silt and loose sand, the establishment of a firm area around a well on which the separator module can be based is an extremely awkward operation.

The pressure control devices also ensure that the phase levels in the separator can be maintained, i.e. a liquid pump has to switch off or operate more slowly if the liquid level drops, so that it does not draw in any gas.

BRIEF DESCRIPTION OF THE DRAWINGS

An example of the present invention will now be described with reference to the accompanying drawings, in which.

DETAILED DESCRIPTION

Figure 1A:
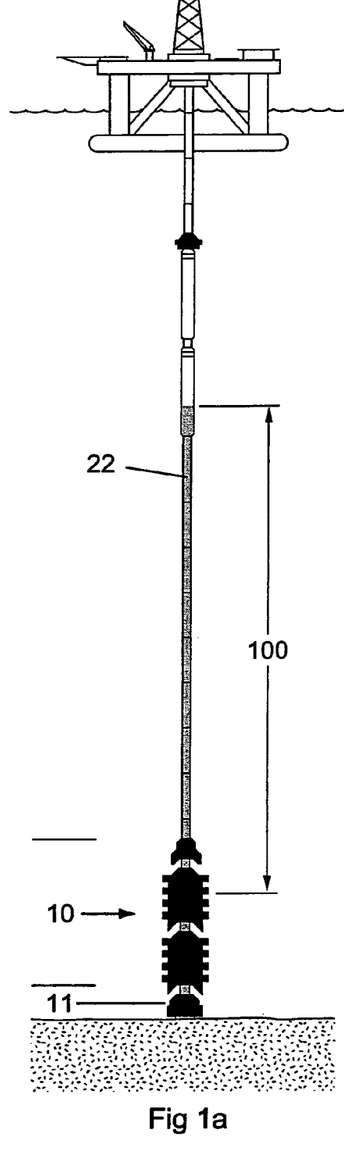
FIGS. 1A and B show a configuration of the present invention of the BOP separation package connected between a subsea BOP ram package and a BOP lower riser package (LRP) using a defined hydrostatic mud head in the riser.
Figure 1B:
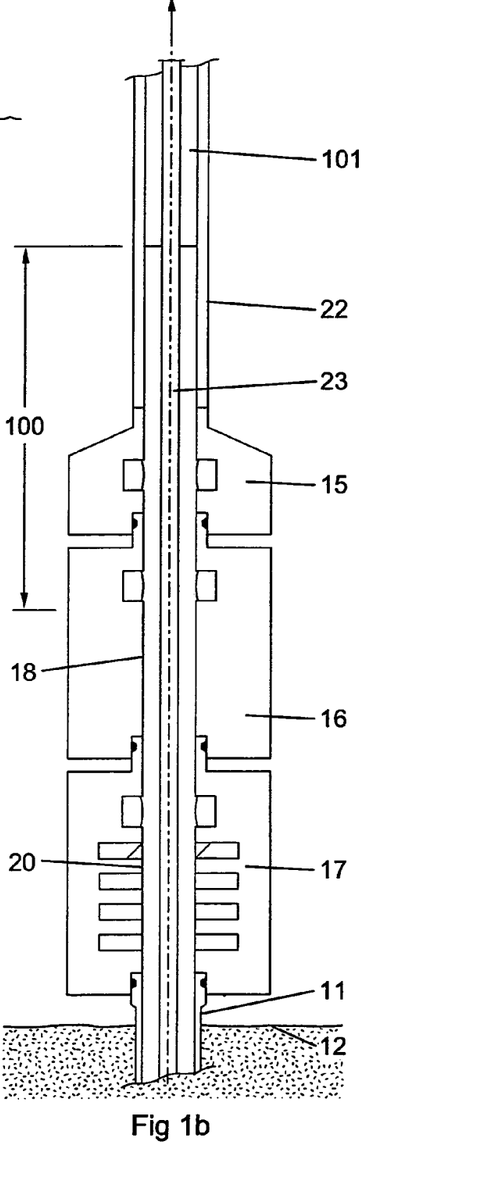

FIGS. 1A and B shows a subsea BOP stack assembly 10 and wellhead assembly 11. A wellhead assembly 11 is formed at the upper end of a bore into the seabed 12. The BOP stack assembly 10 is, in this example, comprised of a BOP lower riser package 15, a BOP separator 16 and a BOP ram package 17. The BOP separator 16 comprises a full bore spool 18. The full bore spool 18, the lower riser package 15 and the BOP ram package 17 are connected in such a way that there is a continuous bore 20 from the lower end of the BOP stack through to the upper end of the LRP 15. The lower end of the BOP stack 17 is connected to the upper end of the wellhead 11 and is sealed in place.

The riser pipe 22 is connected to the LRP 15. FIG. 1 shows the system operating at a wellhead return mud pressure that is insufficient to allow the mud to flow to the surface vessel. The wellhead return mud pressure will be the hydrostatic mud pressure light 100 as the remaining part of the riser will contain atmospheric air 101. The upper part of the LRP 15 is connected to the end of a riser pipe (22). The riser pipe connects the BOP assembly 10 to a surface vessel shown in FIG. 1.

Figure 2:
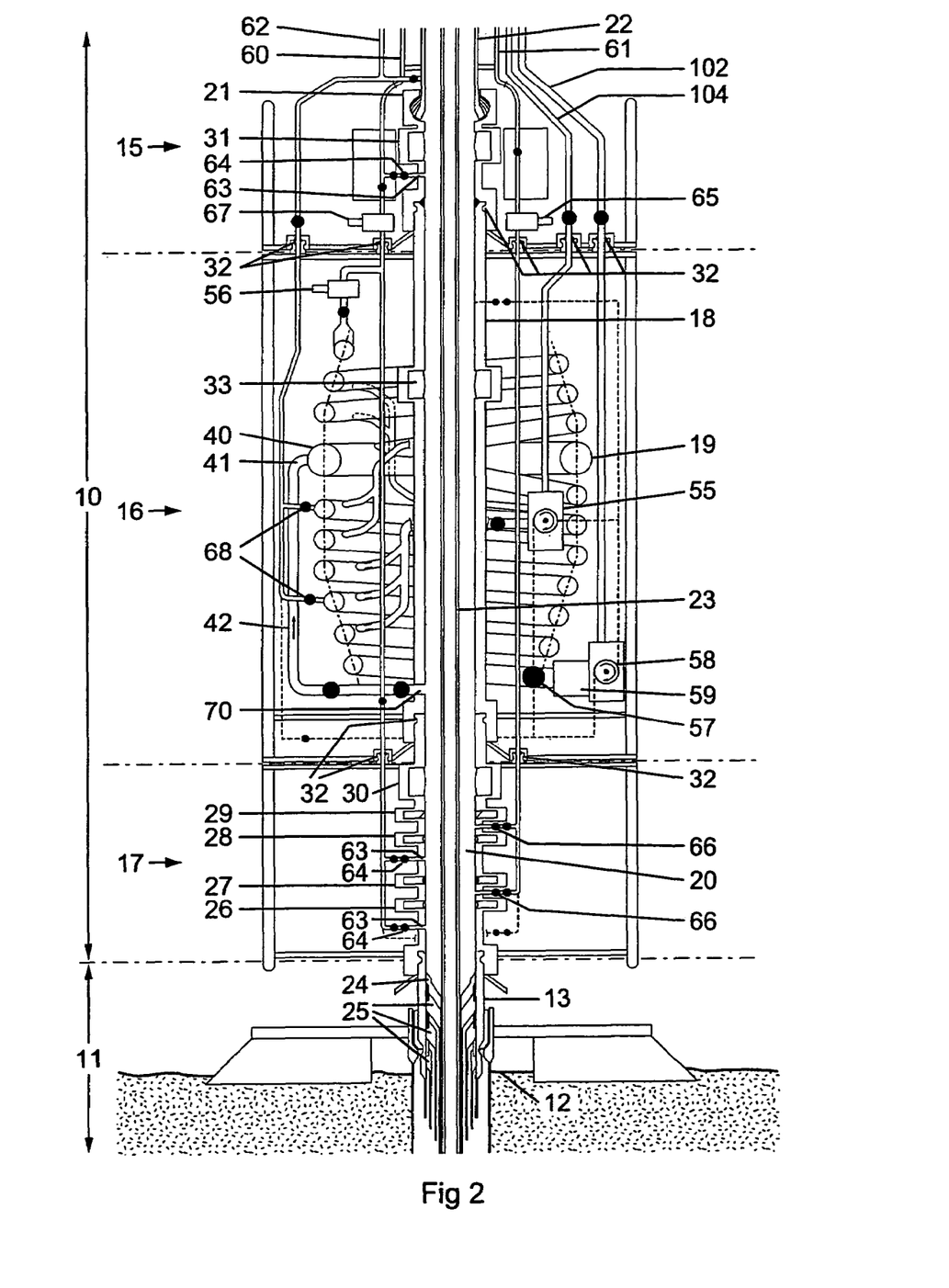
FIG. 2 is a schematic cross sectional view through a system with a defined hydrostatic mud head in the riser according to the present invention.

Within the bore 20, a tubular string 23 is provided. Such a string may incorporate a number of different types of components, including simple piping, joint members, bore guidance equipment and may have attached at its lower end, a test tool, a drill bit or a simple device which allows the circulation or the flow of desired fluids through the well. Alternatively, the string may take the form of casing, tubing, coil tubing, wire line or cables or other components which is necessary to pass through the BOP separator and the BOP ram package into the wellhead 11. FIG. 2 shows the wellhead housing 13, as an example, having a wear bushing 24 and a plurality of casing hangers 25 which are set in the wellhead and extend into the hole in the seabed 12 in the well drilling operation.

The BOP stack is provided with a number of closure members for closing both the bore 20 and/or on the string 23 and these include lower pipe rams 26, middle pipe rams 27, upper pipe rams 28 and shear blind rams 29. These four sets of rams comprise the high-pressure zone in the BOP stack 17 and they can withstand the greatest pressure. The lower, middle and upper pipe rams are designed such that they can close around various diameter tubular strings 23.

Of course, when the lower 26, middle 27 or upper 28 pipe rams are closed, whilst the bore 20 is sealed the bore of the drill string 23 itself is still open. Thus, the shear blind rams 29 are designed such that, when operated, they can cut through the drill string 23 or other tubular in the bore and provide a single pressure mechanical isolating barrier between the pressurised drilling fluid and the surface.

Above the shear blind rams 29, a lower annular 30 is provided and this can also seal around the drill string 23 or other different diameter tubulars when closed and provide a medium pressure contained zone. Within the lower riser package 15, an upper annular 31 is provided and, above this, the lower pressure zone is located and includes the flex joint 21, the riser adaptor 22 and the riser. The low pressure containing means of this zone is mainly the hydrostatic pressure of the fluid, which is retained in the bore open to the surface.

The BOP assembly 10 is also supplied with choke 60, kill 61, and mud booster 62 mud return line 104 and cutting/slurry line 102 lines for supplying fluid to and from the BOP. FIG. 2 shows these are part of the riser system but they could be independent flexible lines leading away from the BOP stack 10 and up to the surface. The choke line 60 is equipped with a choke valve 67. The choke line 60 is, in this example, in a fluid communication with the bore 20 in three locations 63, each location having an individual branch, which is controlled by a pair of valves 64.

On the opposite side of the BOP, the kill line 61 is equipped with a kill line choke valve 65, before the kill line 61 enters the bore 20 at two locations, again each of which is via a pair of valves 66.

The mud booster line 62 connects into various stages of the separator 16 and Lower Riser Package 15 bore, via valves 68.

Between the lower annular 30 and the upper annular 31, the BOP separator is provided. The BOP separator 16 is removably connected via various connection points 32 so that it can removed from the upper end of the BOP ram package 17 should this be necessary or installed when required for working on certain sections of the well.

The BOP separator 16 includes the full bore spool 18 which itself has a separator annular 33 which can seal around the drill string or various sized tubulars 23.

Figure 3:
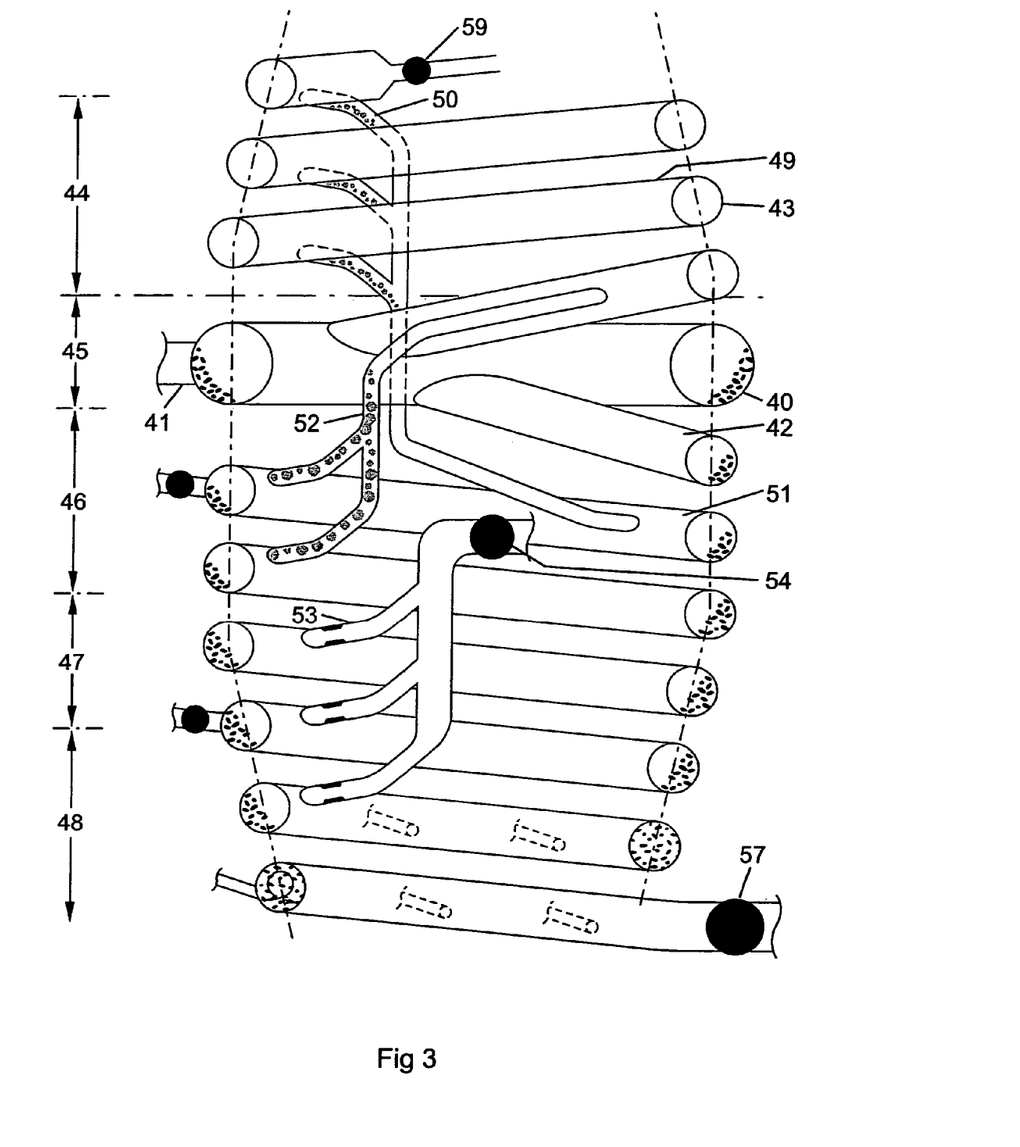
FIG. 3 is a schematic view of the separator of FIGS. 1 and 2.

A toroidal separator 19 is provided around the full bore spool 18 and includes a tubular bore 40, which can handle the flow rate, burst and collapse pressures, is in the shape of a horizontal ring and is provided for receiving multi-phase flow through inlet 41 which is connected to flow passage 42 which, in itself, is connected to the bore spool 18. In this example, unseparated drilling mud from the BOP ram package bore 20 enters the BOP separator package full bore spool 18. The static hydrostatic mud column 100 exerts a set operating pressure in the subsea BOP stack 10 and forcing the returning unseparated mud flow and any fluids which have come out of the well formations to be supplied to the separator 19 via port 70 in the wall of the spool 18. As such, the separator 19 can be utilised to separate this multi-phase flow into its constituent phases for further processing and delivery to the surface.

The diameter of the bore 40 is dependent upon the flow rate and burst and collapse pressures, being typically between 300 and 1000 mm in diameter. The fluid entering the bore 40 is preferably cause to enter in a tangential direction and on the outer circumference of the bore 40, thereby causing a jetting action which helps to induce and maintain the velocity of the flow within the bore 40. The circular flow that is induced in the multi-phase fluid causes heavier fluids and any solid particles to move to the outer circumference of the bore 40, with the lighter fluids on the inner circumference of the bore 40. As the bore 40 is mounted substantially horizontally, gravitational effects pull the heavier fluids towards the lower outer portion of the bore 40 and this results in the lighter fluids moving to the inner upper portion of the bore 40.

As can be seen in FIG. 3, the main bore 40 is provided with exit lines 42 and 43 for the heavier and lighter fluids respectively. The exit line 42 is tangential to the bottom circumference of the bore 40 and is mounted on the outer lower bottom portion of the bore 40. The exit line 43 for the lighter fluids is mounted tangentially to the upper inner top portion of the bore 40. The location of the outlet is, of course, dependent upon the flow, which it is expected to receive and therefore the location of the connections of the exit lines can be changed without affecting the operation of the invention.

The separator is divided into five interlinking areas, a gas spiral 44, a mud ring toroidal 45, a liquid stabilising spiral section 46, a mud cutting separation section 47 and a cuttings removal section 48. The usual mode would comprise of drilling mud and solids.

In this example, the multi-phase flow through inlet 41 typically could also comprise of gas, oil, water, drilling mud and solids and the separation in bore 40 permits wet gas, that is mainly gas but within entrained liquid, to exit through exit line 43. Solids, oil, water; mud and a little entrained gas leave the bore 40 through exit line 42.

The wet gas travels upwardly through gas spiral 44 by means of a spiral conduit 49 with the pressure/flow rate controlled by a choke valve 56. The liquid within the wet gas is forced onto the outer wall of the conduit 49 and collects. At certain points in the outer wall, liquid drain pipes 50 are provided to direct any liquid that has been separated from the gas flow back in to the liquid stabilising section 46. The multi-phase liquid having trapped gas, which exits through exit line 42, passes into the liquid stabilisation section 46 which is the upper portion of a spiral conduit 51. As the liquid spirals down the conduit 51, any entrained gas is separated to the inner upper portion of the conduit and is separated off via the exit lines 52 and is directed in to the gas spiral 44. As the fluid passes further down through the conduit 51 and the gas has been removed, it is the mud which moves to the upper inner portion and this is separated off via exit lines 53 in to a common pathway which passes via a mud isolation valve 54 to a mud pump 55. The gas that reaches the upper end of the gas spiral 44 passes through a gas isolation valve 59, past a gas choke 56 and into the choke line 60.

At the lower most end of the conduit 51, the cuttings slurry, containing some residual liquid and cuttings from the drilling process, pass out of the conduit spiral 51 via cuttings isolation valve 57 into a cuttings slurry pump 58. As shown in FIG. 2, a cuttings grinding unit 59 may be provided between the cuttings isolation valve 57 and the slurry pump 58 to reduce the size of the cuttings particles which are to be pumped back to the surface in a cutting/slurry line 102.

If higher levels of separation are required the phases can be admitted for a further separation using a second or third separator. Alternatively, additional tubular bores 40 can be provided as one or each exit line 42, 43 to provide additional separation before the spiral conduits 43, 51.

Figure 4:
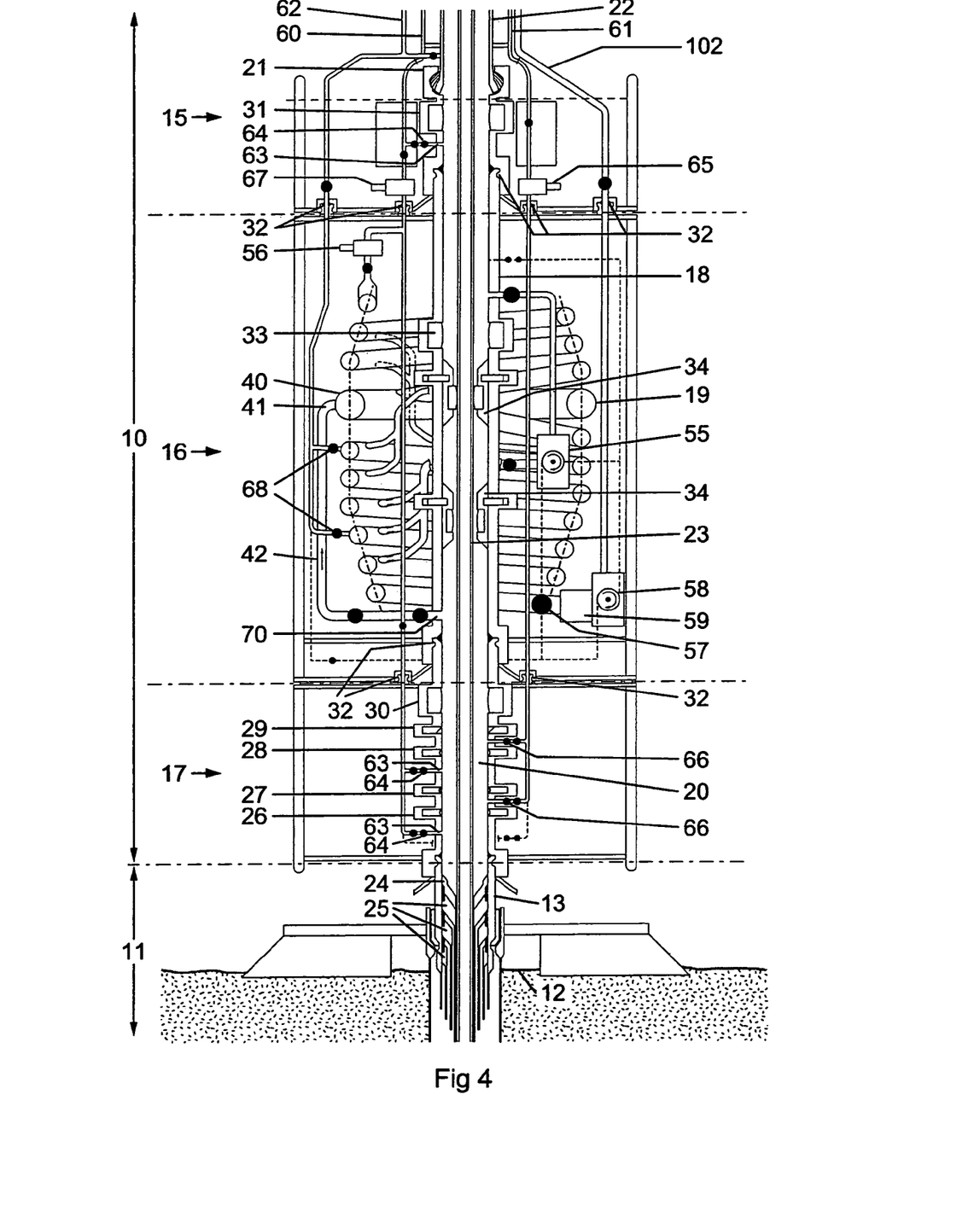
FIG. 4 shows a schematic cross sectional view through the system of FIG. 2 using a sealing element in the subsea BOP to eliminate the hydrostatic mud column in the riser.

FIG. 4 shows a further refinement to the system in that the full bore spool 18 has a pair of seals 34, preferably removable seals as described in our co-pending patent application filed on the same day and entitled "Removable Seal" and bearing the patent agent's reference MJB07416EP.

The upper removable seal 34 is energised so as to provide a fluid tight seal between the separated mud and the upper portion of bore 20 and the unseparated mud in the lower portion of bore 20, the unseparated mud being supplied to the separator 19 via port 70 in the wall of the spool 18.

The upper seal 34 acts as a pressure isolating device to contain the pressure of the drilling mud in the wellhead and of any fluid entering the wellhead from the formation which eliminates the need for a static fixed height hydrostatic mud head 100 in this riser. The bore of the riser 22 or the annulus formed in the bore been any tubular string 23 is now independent of the returning mud flow system. Separated mud from mud pump 55 can now re-enter the spool bore 18 above the pair of removable seals 34 and flow to the surface in the conventional return mud configuration. This configuration eliminates the need for an extra line in the form of a mud line 104 shown in FIG. 3.

FIGS. 5A to F show various operations and how the BOP separator can be optimised in a well drilling programme.

Figure 5A:
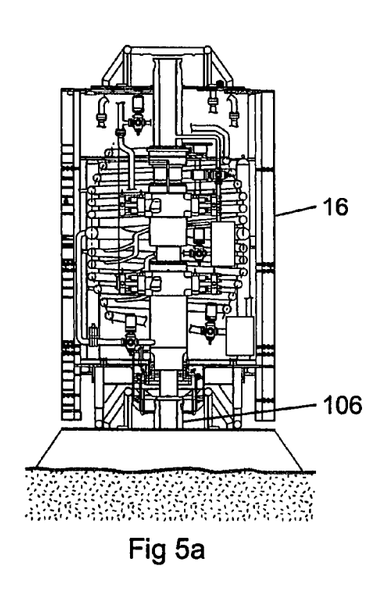
FIG. 5A to F show various drilling and well installation stages using the system during the formation of a subsea well.

FIG. 5A show the BOP separation package 16 having been separately run, preferably on a drilling string to reduce rig time, and parked on a nearby wellhead or dummy wellhead 106.

Figure 5B:
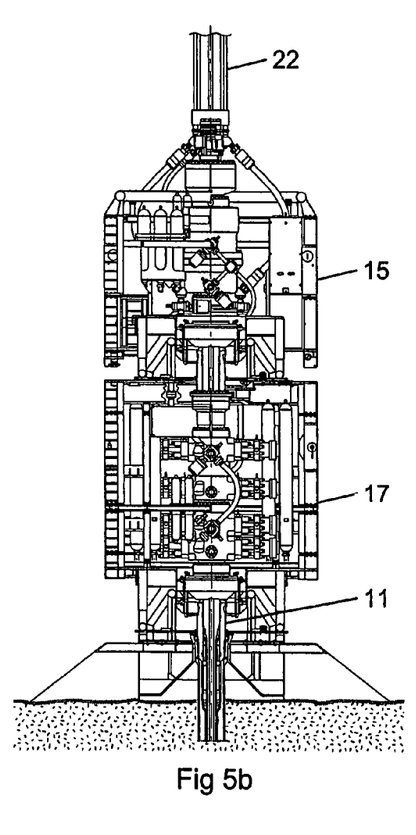
Figure 5C:
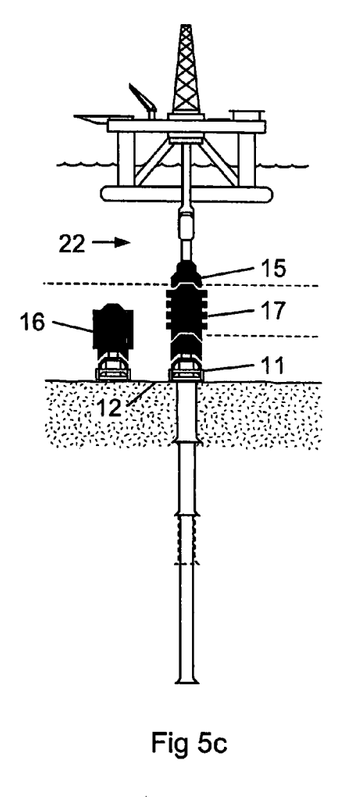

FIG. 5B shows a conventional subsea BOP ram package 17 and LRP 15 connected to a wellhead 11 for conventionally drilling the top hole section of a well as shown in FIG. 5C.

Figure 5D:
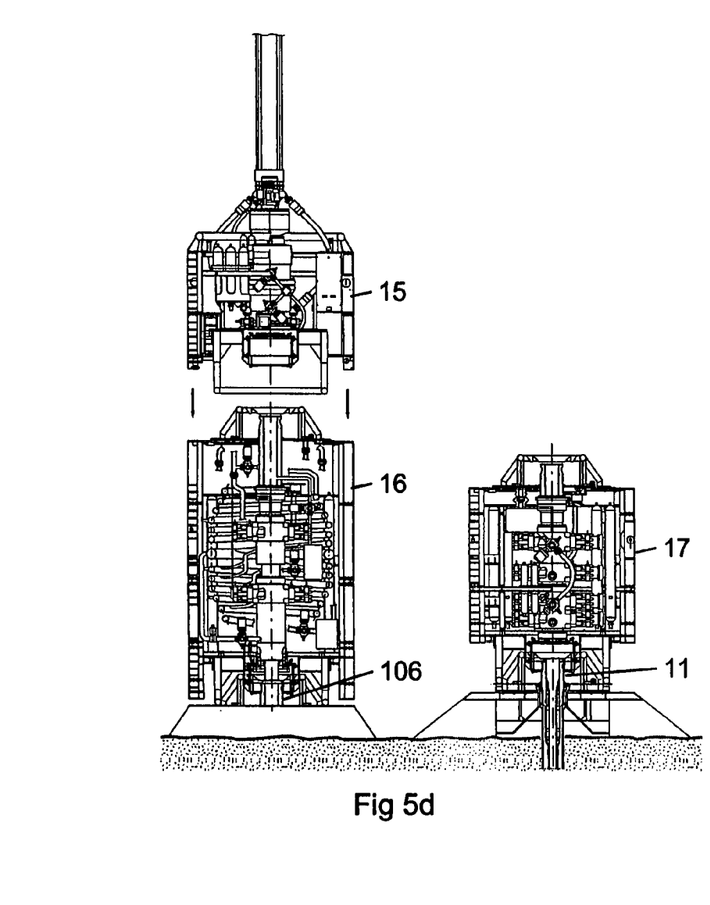
Figure 5E:
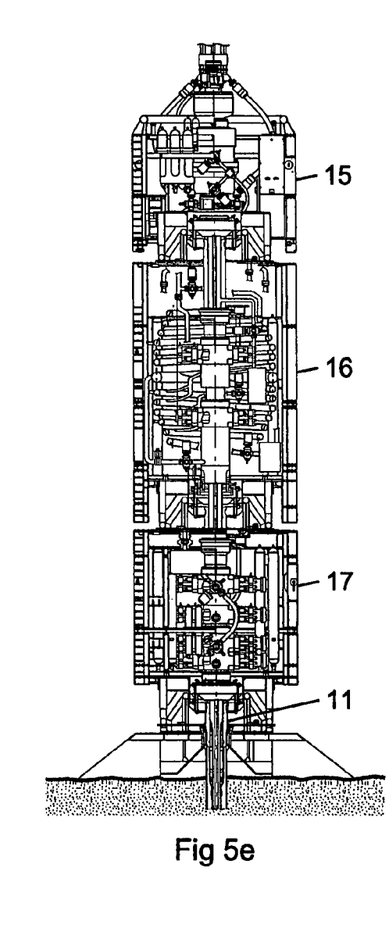
Figure 5F:
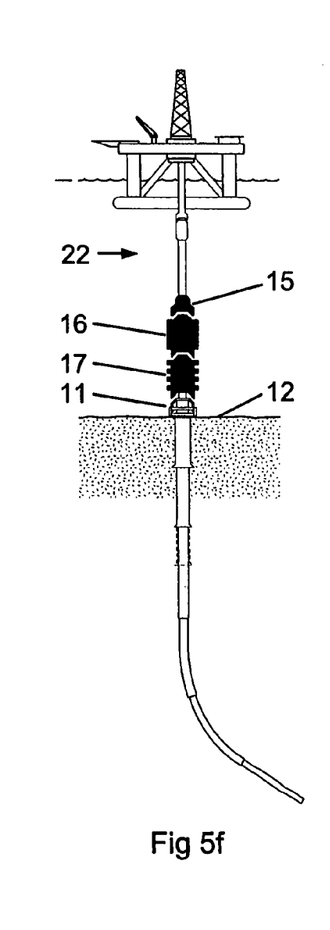

When the BOP separation package 16 is required, the well can be isolated using the features of the BOP Ram Package 17 and the LRP is disconnected. The vessel can now move across and connect the LRP 15 to the BOP separation package 16 as shown in FIG. 5D, and move it across and connect it to the top of BOP ram package 17 as shown in FIG. 5E. Using the separation and pumping features of this invention this now allows the next section of hole to be drilled with a optimum mud density that either the formation pore pressure or the fracture pressure could not support up to the surface as shown in FIG. 5F.

The ability to alter the return mud pressure in the subsea BOP means that longer sections or most of the well can be drilled with a constant mud density. This saves the costly changing of the mud density and rig time involved for each section of hole.

By selecting a optimum density mud and combining it with the ability to select the subsea BOP return mud pressure, a different mud pressure/depth gradient is achievable. This gradient can be selected to be in the safe operating range between the formations pore and fracture pressure which is not possible if the return mud has to flow to the surface. In conventional wells, this now requires the running and cementing of a casing string to pressure isolate the drilled formation before entering the next formation, which could require difference drilling parameter. Using the BOP separator means longer sections of hole can be drilled in one phase and less casing strings are required. Both factors will considerably reduce the cost of the well and the exposure to certain operational risks.

The various steps shown in FIGS. 5A–F can be applied in a different order in respect to the well operation, whether being drilling, a workover well intervention or to pull the BOP separator package for maintenance, service or repair with or without using the drilling riser.

Figure 6:
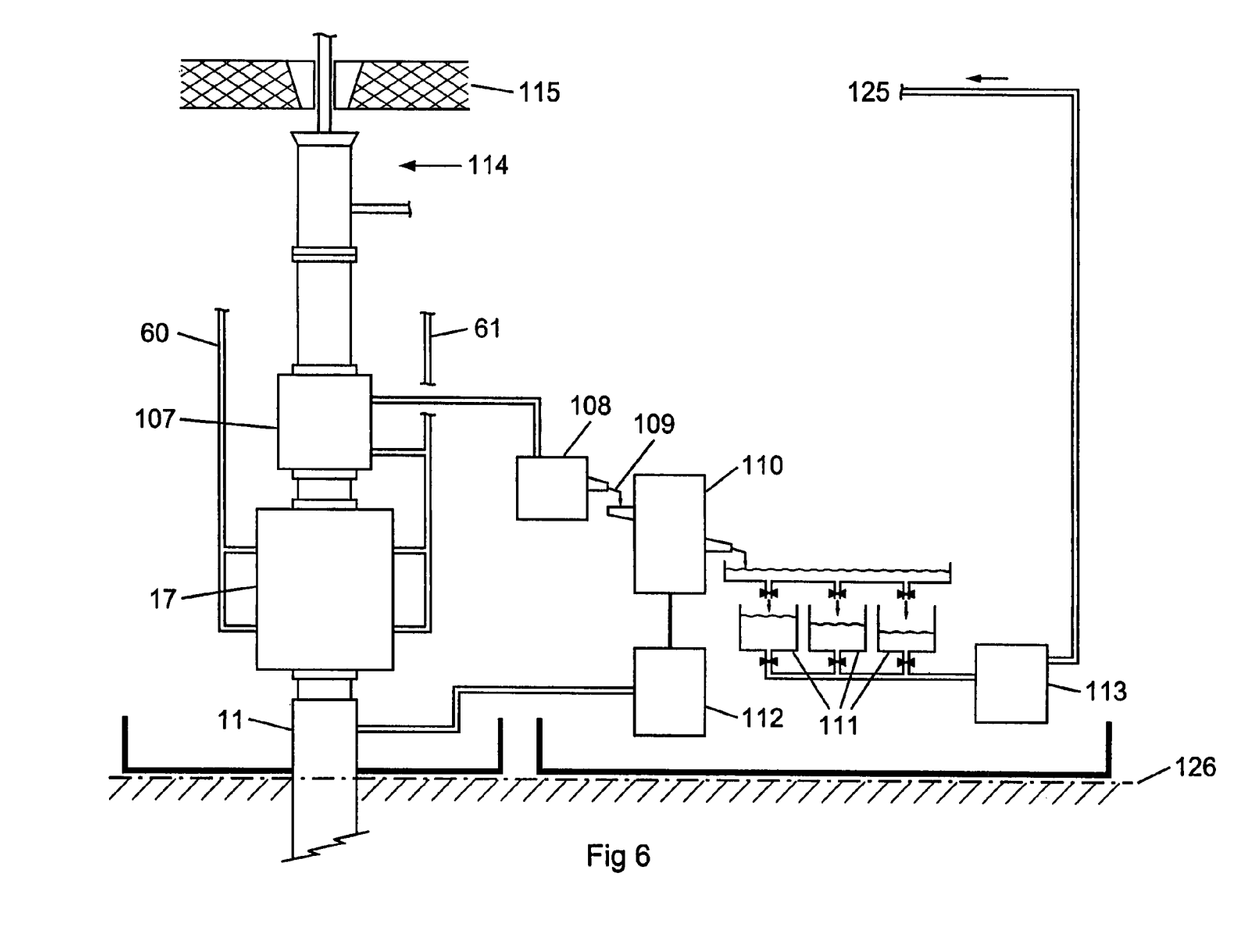
FIG. 6 shows a conventional surface arrangement for the drilling of a well.

FIG. 6 shows a surface arrangement 126, either on land or a platform deck, in which the upper end of a wellhead 11 is connected to a BOP ram package 17 having, as described in earlier Figures, numerous rams, annulars and valves to allow appropriate operation. The BOP ram package is connected, at its upper end, to a pressure containing package 107 which utilises annulars to ensure that the pressure of the fluid within the bore being drilled is contained. Above this, a conventional surface configuration is shown with an atmospheric mud diverter system 114 and, above this, the drill floor 115. The pressure containing package has an outlet feed line into an automated choke manifold 108, which drops the pressure of the multi-phase medium returned from the drilling zone to atmospheric pressure 109. The multi-phase medium at atmospheric pressure then flows to a solids processing package 110, fluid storage tanks 111 and an optional cuttings injection pump 112.

The atmospheric fluid storage tanks 111 function as a mud conditioning zone, so that the liquid, primarily drilling mud, can be pumped using a pump 113 via a return line, back into the drill pipe or tubing string 125 and reused during the drilling process. The solid slurry can be passed into the cuttings injection pump, so that it can be reinjected into the well via the wellhead injection line.

Figure 7:
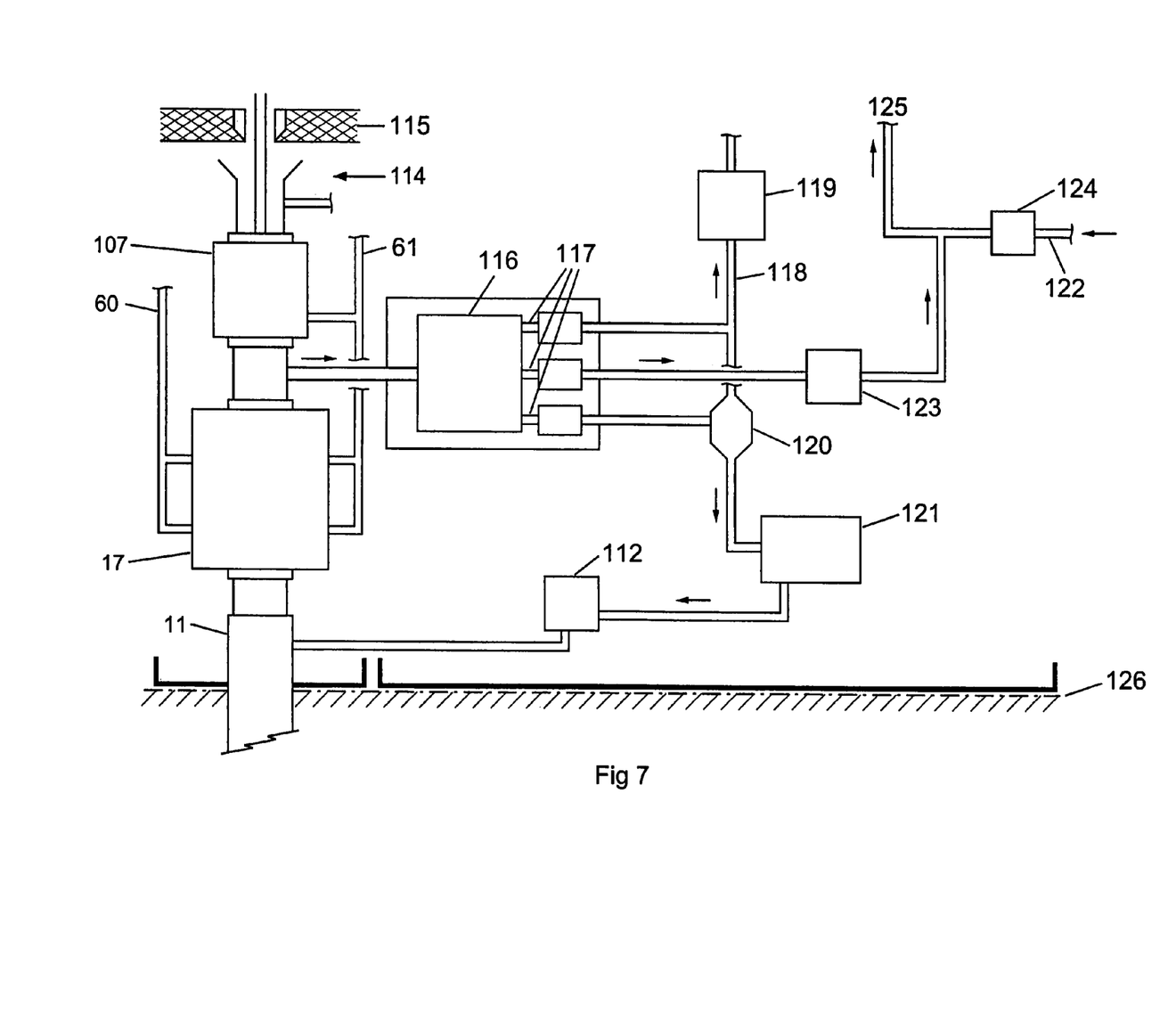
FIG. 7 shows a surface arrangement for drilling a well using the present invention.

In FIG. 7, the wellhead, BOP ram package and pressure containing package are substantially similar to that in FIG. 6, but the outlet feed line passes into a toroidal separator 116, such as that described with regard to the subsea embodiment, to separate the multi-phase medium into its individual phase. This ensures that the pressure for the individual phases does not have to drop to atmospheric pressure.

The separated phases are supplied along individual supply lines 117. The gas is passed along the gas vent line 118 into a gas handling package 119 where the gas can be further processed. The solids slurry passes into a gas scrubber where any residual gas is separated and supplied to the gas vent line. The solids slurry then passes into a solids processing package 121 for further processing.

The mud is supplied along a mud supply line, but has not been reduced significantly in pressure. Additional pumps 123 are provided to boost the pressure of the mud to the required drill pipe pressure. New conditioned mud, supplied from pumps 124, provides a pressurised mixing system.

What is claimed is:

1. A system for use in down hole operations, the system comprising:
   a wellhead;
   a BOP ram package connected at one end to the wellhead and having an axial bore extending from the wellhead to the other end;
   a pressure isolating device above the other end of the BOP ram package;
   a fluid take off between said pressure isolating device and the BOP ram package;
   a separator in communication with the fluid take off such that, in use, a multi-phase medium obtained from the well can be separated into at least three phases;
   a plurality of outlets disposed on said separator, wherein said plurality of outlets includes at least one outlet for each of the at least three phases; and
   a plurality of pressure control devices, wherein a pressure control device is provided on each of said plurality of outlets for allowing the system to be operated at different wellhead pressures.

2. A system according to claim 1, wherein the pressure control device includes at least one of a choke or a pump.

3. A system according to claim 2, wherein the pump is a variable speed pump.

4. A system according to claim 1, further comprising a control system for monitoring and controlling the pressure control device.

5. A system according to claim 1, wherein the pressure isolating device is arranged to allow, in use, at least one downhole string to be passed therethrough, whilst maintaining its pressure isolating ability.

6. A system according to claim 5, wherein the pressure isolating device is a flexible seal.

7. A system according to claim 6, wherein the pressure isolating device is an annular seal.

8. A system according to claim 6, wherein the flexible seal is rotatably mounted.

9. A system according to claim 1, wherein the separator contains at least one toroidal separator.

10. A system according to claim 9, wherein the separator contains two or three toroidal separators.

11. A system according to claim 9, wherein the toroidal separator is mounted around a full bore spool.

12. A system according to claim 1, wherein the separator has outlets for gaseous fluid, liquid and solid slurry.

13. A system according to claim 12, further comprising a cuttings grinding unit between the separator and a slurry pump.

14. A separator for use during downhole operations, the separator unit comprising:
   a full bore spool for, in use, connection to a BOP ram unit;
   a toroidal separator surrounding and in communication with the spool, wherein said toroidal separator separates a multi-phase material delivered to the spool from the BOP ram unit in to gaseous, mud, and cuttings slurry phases;
   a plurality of outlets disposed on said toroidal separator, wherein said plurality of outlets includes at least one outlet for each of the gaseous, mud and cuttings slurry phases; and
   a plurality of pressure control devices, wherein a pressure control device is provided on each of said plurality of outlets.

15. A method of separating material produced from a well during downhole operations, the method comprising the steps;
   supplying multi-phase material from a wellhead through a BOP ram package to a full bore spool;
   diverting the multi-phase flow through a toroidal separator comprising:
     a plurality of outlets, wherein said plurality of outlets includes at least one outlet for each of a gaseous, mud and cuttings slurry phase; and
     a plurality of pressure control devices, wherein a pressure control device is provided on each of said plurality of outlets;
   separating the multi-phase flow in to gaseous, mud, and cuttings slurry phases; and
   controlling the pressure of each of the gaseous, mud, and cuttings slurry phases with said plurality of pressure control devices so as to achieve a specified wellhead pressure.

16. A system comprising:
   a spool body having a bore therethrough;
   a first pressure isolating barrier coupled to said spool body and operable to isolate pressure within the bore from pressure below said first pressure isolating barrier;
   an second pressure isolating barrier coupled to said spool body and operable to isolate pressure within the bore from pressure above said second pressure isolating barrier;
   a fluid take off in fluid communication with the bore between said first pressure isolating barrier and said second pressure isolating barrier;
   a separator in fluid communication with said fluid take off; and
   a plurality of outlets disposed on said separator, wherein each of said plurality of outlets has a pressure control device coupled thereto.

17. The system of claim 16, wherein said first pressure isolating barrier comprises a BOP stack.

18. The system of claim 16, wherein said spool body is a full bore spool.

19. The system of claim 16, wherein said separator comprises at least one toroidal separator.

20. The system of claim 18, wherein said at least one toroidal separator is mounted around said full bore spool.

21. The system of claim 16, wherein said second pressure isolating device is a flexible seal.

22. The system of claim 21, wherein said second pressure isolating device is an annular seal.

23. The system of claim 22, where said annular seal is integrated into said spool body.

24. The system of claim 16 further comprising a wellbore substantially vertically aligned with, and in fluid communication with, said bore.

25. The system of claim 16, wherein said first pressure isolating device is operable to isolate pressure within the bore from pressure below said first pressure isolating barrier when a tubular string is disposed within the bore.

26. The system of claim 16 further comprising a lower riser package removably coupled to said spool body above said second pressure isolating device.

* * * * *